(12) United States Patent
Fitzgerald

(10) Patent No.: US 10,171,719 B1
(45) Date of Patent: Jan. 1, 2019

(54) WIRELESS HEADGEAR

(71) Applicant: Robert E Fitzgerald, North Barrington, IL (US)

(72) Inventor: Robert E Fitzgerald, North Barrington, IL (US)

(*) Notice: Subject to any disclaimer, the term of this patent is extended or adjusted under 35 U.S.C. 154(b) by 1237 days.

(21) Appl. No.: 14/275,916

(22) Filed: May 13, 2014

Related U.S. Application Data

(63) Continuation of application No. 13/949,207, filed on Jul. 23, 2013.

(60) Provisional application No. 61/970,884, filed on Mar. 26, 2014, provisional application No. 61/822,838, filed on May 13, 2013, provisional application No. 61/775,249, filed on Mar. 8, 2013, provisional application No. 61/774,493, filed on Mar. 7, 2013, provisional application No. 61/731,730, filed on Nov. 30, 2012, provisional application No. 61/678,937, filed on Aug. 2, 2012.

(51) Int. Cl.
*A42B 1/24* (2006.01)
*H04N 5/232* (2006.01)
*H04B 7/26* (2006.01)

(52) U.S. Cl.
CPC ........ *H04N 5/23203* (2013.01); *A42B 1/24* (2013.01); *H04B 7/26* (2013.01); *H04N 5/23229* (2013.01)

(58) Field of Classification Search
CPC ... H04N 5/23203; H04N 7/26; H04N 5/23229
See application file for complete search history.

(56) References Cited

U.S. PATENT DOCUMENTS

| | | | |
|---|---|---|---|
| 4,916,596 A | 4/1990 | Sharrah et al. |
| 4,991,068 A | 2/1991 | Mickey |
| 5,463,538 A | 10/1995 | Womack |
| 5,541,816 A | 7/1996 | Miserendino |
| 5,667,292 A | 9/1997 | Sabalvaro, Jr. |
| 5,741,060 A | 4/1998 | Johnson |

(Continued)

FOREIGN PATENT DOCUMENTS

| | | |
|---|---|---|
| EP | 1619535 B1 | 2/2008 |
| EP | 1046411 A2 | 6/2011 |

(Continued)

OTHER PUBLICATIONS

Looxcie 2 User Manual for iPhone 2011.

*Primary Examiner* — Richale Quinn
(74) *Attorney, Agent, or Firm* — Luis M. Ortiz; Kermit D. Lopez; Ortiz & Lopez, PLLC

(57) ABSTRACT

Wireless headwear has a brim and a rechargeable power source and a receptacle for a detachable plug-in micro camera. A short-range component built into the brim sends data from the camera to external devices such as smartphones or tablets or potable video/music player. The device can eternally control the camera functions; including but not limited to zooming, taking a snapshot, recoding a video, lighten and darken image, increase/decrease pixels, compression of data. A FIFO video buffer of a predetermined duration and an instant save button preserve the contents of the FIFO video buffer upon activation of the instant save button. A processor preserves the contents of the FIFO video buffer during a selected duration dependent on how much time has passed since any previous operation of the instant save button.

18 Claims, 13 Drawing Sheets

(56) References Cited

U.S. PATENT DOCUMENTS

| | | |
|---|---|---|
| D411,756 S | 7/1999 | Land |
| 6,056,413 A | 5/2000 | Urso |
| 6,256,795 B1 | 7/2001 | Habel |
| D448,099 S | 9/2001 | Mariani |
| 6,467,929 B2 | 10/2002 | Lee |
| 6,560,029 B1 | 5/2003 | Dobbie et al. |
| D475,179 S | 6/2003 | Chan |
| 6,616,293 B2 | 9/2003 | Mickey |
| 6,659,618 B2 | 12/2003 | Waters |
| 6,721,962 B1 | 4/2004 | Polaire |
| D489,165 S | 5/2004 | Waters |
| 6,733,150 B1 | 5/2004 | Hanley |
| 6,895,602 B2 | 5/2005 | Schlapkohl |
| 6,953,260 B1 | 10/2005 | Allen |
| 6,978,162 B2 | 12/2005 | Russell et al. |
| 6,994,445 B1 | 2/2006 | Pomes |
| 7,055,979 B2 | 6/2006 | Lee et al. |
| 7,075,250 B2 | 7/2006 | Colwell |
| 7,086,749 B1 | 8/2006 | Hanley |
| 7,163,309 B2 | 1/2007 | Sohn et al. |
| D541,452 S | 4/2007 | Schnell |
| 7,234,831 B1 | 6/2007 | Hanley |
| 7,290,292 B1 | 11/2007 | Nellon |
| 7,303,302 B2 | 12/2007 | Harris |
| D566,311 S | 4/2008 | Schnell |
| D612,133 S | 3/2010 | Hermann, II |
| 7,750,860 B2 * | 7/2010 | Mohamadi ............ A42B 3/0433 343/718 |
| D627,140 S | 11/2010 | Dyer |
| 8,001,623 B2 * | 8/2011 | Gertsch .................... A42B 3/04 2/410 |
| 8,087,797 B2 | 1/2012 | Pelletier et al. |
| 8,107,664 B2 | 1/2012 | Mao |
| 8,159,402 B2 * | 4/2012 | Alameh ................ H01Q 1/241 343/702 |
| 8,248,029 B2 | 8/2012 | Hrabal |
| 8,314,590 B2 | 11/2012 | Chen |
| 8,415,917 B1 | 4/2013 | Faris |
| 8,418,852 B2 | 4/2013 | Ziemba |
| 8,432,124 B2 | 4/2013 | Foster |
| 8,593,570 B2 | 11/2013 | Boland et al. |
| 8,804,987 B2 * | 8/2014 | Lee ........................ A42B 1/245 2/175.1 |
| 9,332,797 B2 * | 5/2016 | Abers .................... A42B 1/002 |
| 9,788,586 B2 * | 10/2017 | Kendis ..................... A42B 1/24 |
| 9,814,278 B2 * | 11/2017 | Chung ................. A42B 3/0453 |
| 2003/0231489 A1 | 12/2003 | Hsiao |
| 2004/0008157 A1 | 1/2004 | Brubaker et al. |
| 2004/0180691 A1 * | 9/2004 | Cascone ................ A42B 1/245 455/557 |
| 2005/0058317 A1 * | 3/2005 | Montgomery ......... A42B 1/245 381/376 |
| 2005/0167590 A1 | 8/2005 | Miyano et al. |
| 2008/0023002 A1 | 1/2008 | Guelzow et al. |
| 2008/0130272 A1 | 6/2008 | Waters |
| 2008/0266839 A1 | 10/2008 | Claypool et al. |
| 2009/0193565 A1 | 8/2009 | Wilens |
| 2009/0193566 A1 | 8/2009 | Waters |
| 2010/0095431 A1 | 4/2010 | Liao |
| 2010/0214767 A1 | 8/2010 | Waters |
| 2012/0014095 A2 | 8/2010 | Waters |
| 2010/0313335 A1 | 12/2010 | Waters |
| 2011/0242799 A1 | 10/2011 | Dyer |
| 2012/0077438 A1 | 3/2012 | Jung |
| 2012/0306641 A1 | 12/2012 | Howard et al. |
| 2013/0201299 A1 | 8/2013 | Waters |
| 2015/0356610 A1 * | 12/2015 | Ponoth ................ G06Q 10/087 705/14.58 |
| 2015/0370320 A1 * | 12/2015 | Connor ................ A61B 5/6831 345/173 |
| 2016/0106174 A1 * | 4/2016 | Chung ................. A42B 3/0453 340/539.13 |
| 2016/0140826 A1 * | 5/2016 | Sahiholnasab ......... A61B 5/103 340/573.7 |
| 2016/0203663 A1 * | 7/2016 | Proctor ............... G07C 9/00111 345/8 |
| 2016/0239084 A1 * | 8/2016 | Connor ................ A61B 5/0478 |
| 2017/0146801 A1 * | 5/2017 | Stempora ........... G02B 27/0172 |
| 2017/0251933 A1 * | 9/2017 | Braun ................ A61B 5/02055 |

FOREIGN PATENT DOCUMENTS

| | | |
|---|---|---|
| WO | 2011018666 A1 | 2/2011 |
| WO | 2012078766 | 6/2012 |
| WO | 2013087816 A1 | 6/2013 |
| WO | 2013096895 A1 | 6/2013 |

* cited by examiner

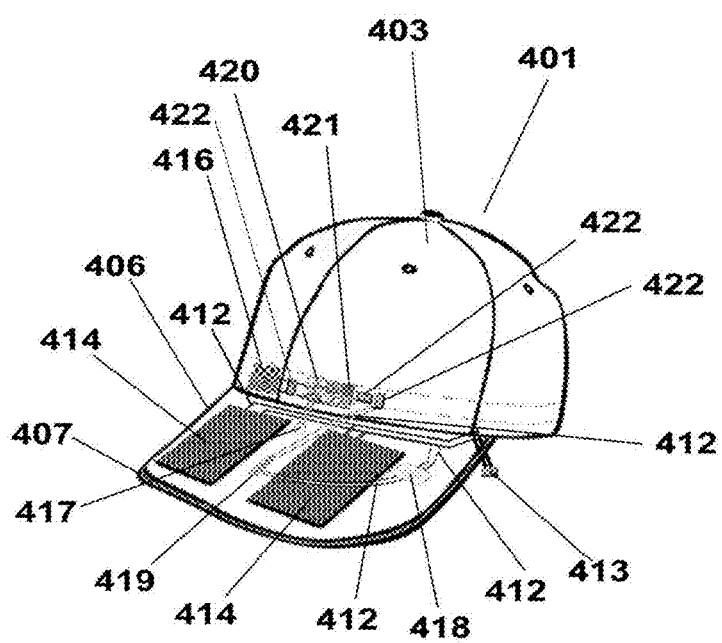
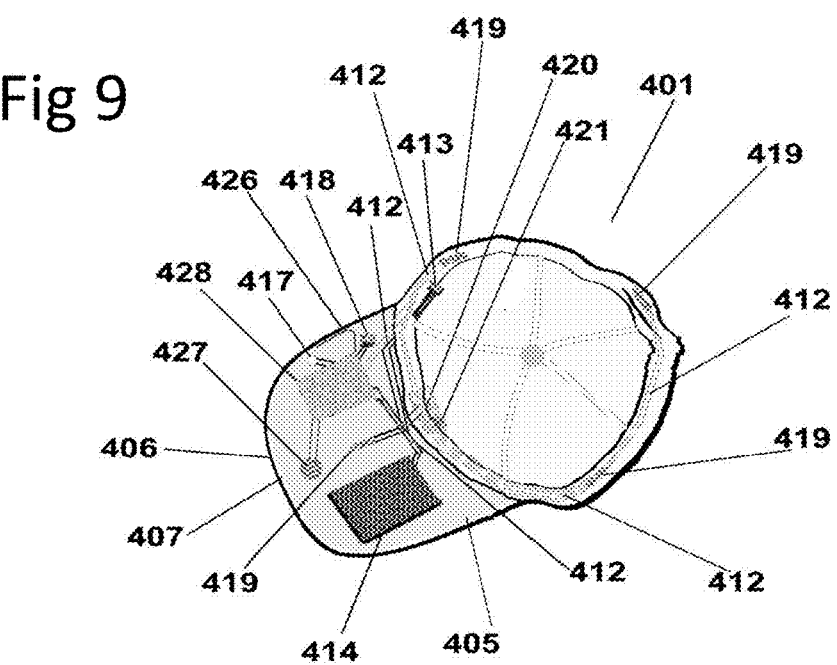

WIRELESS HEADGEAR

BACKGROUND OF THE INVENTIONS

1. Technical Field

The present inventions relate to wearable headwear/headgear with direct wireless communication abilities with a smartphone, tablets and computers and more particularly, relate to a hidden power source with hidden Bluetooth/Wi-Fi communication that connects the data signal to and from headwear/headgear to a smartphone/tablet/computer then to and from a smartphone/tablet to 3G/4G network.

2. Description of the Related Art

The specifically designed utility relating my design in headwear/headgear; there are countless designs, many patent applications and a number of issued patents. In regards to other Bluetooth devices found in headgear (U.S. Pat. No. 8,107,664, US20120306641, US697816, WO2012078766, U.S. Pat. No. 8,107,664, US20120077438), none of them are able of sending images and audio to a smartphone/tablet/computer in real time/almost instantaneously and from the smartphone to a 3G/4G network so images and audio can be accessed from around the world. When reviewing headwear/headgear that has speakers (US20090193565) none of them are Bluetooth/Wi-Fi connected to a smartphone and can send audio signal in real time/almost instantaneously to a smartphone/tablet/computer and from the smartphone to a 3G/4G network so audio can be accessed from around the world. When reviewing headwear/headgear with a camera or imaging abilities (WO2011018666, EP1046411, EP1619535, U.S. Pat. No. 6,560,029, US20050167590, US20080023002, and WO2013087816, WO2013096895, US20040008157) none of them are able of sending images and audio to a smartphone/tablet/computer in real time/almost instantaneously and from the smartphone to a 3G/4G network so images and audio can be accessed from around the world. In regards to headwear/headgear that can project an image onto a pair of glasses there are no devices patents or application to date. The only thing similar would be the "Google Glass" which is mounted to a pair of glasses and does not sending images and audio to a smartphone/tablet/computer in real time/almost instantaneously and from the smartphone to a 3G/4G network so images and audio can be accessed from around the world.

BRIEF DESCRIPTION OF THE DRAWINGS

The present inventions are illustrated by way of example and are not limited by the accompanying figures, in which like references indicate similar elements. Elements in the figures are illustrated for simplicity and clarity and have not necessarily been drawn to scale.

The details of the preferred embodiments will be more readily understood from the following detailed description when read in conjunction with the accompanying drawings wherein:

FIG. 8 illustrates a perspective view of the headwear with a power source of an optional rechargeable battery and USB port (Universal Serial Bus Port) to add power to the battery, and a attachable/detachable image processor component in the crown with a Bluetooth/wireless transmitter in the crown according one embodiment of the present inventions;

FIG. 9 illustrates a underside perspective view of the headwear with a power source using a rechargeable battery and USB port (Universal Serial Bus Port) to add power to the battery, a microphone built into the brim, a sound processor component with Bluetooth/wireless transmitter according one embodiment of the present inventions;

DETAILED DESCRIPTION OF THE PREFERRED EMBODIMENTS

Figure 1:
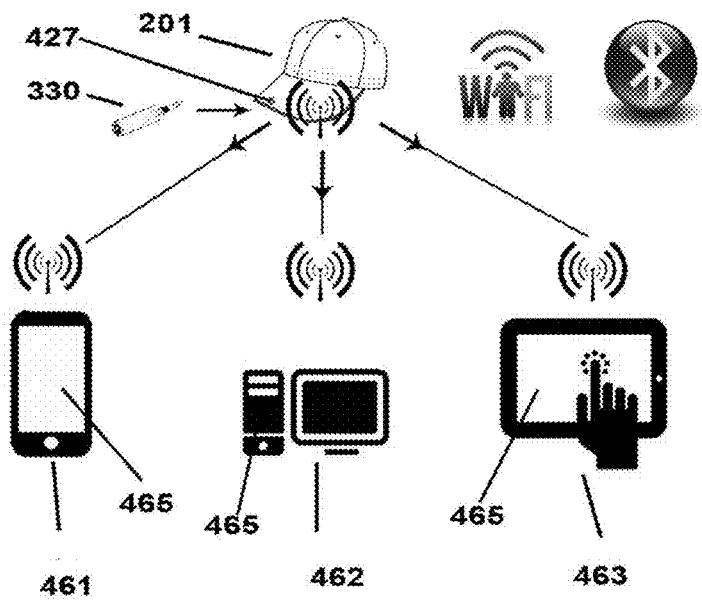
FIG. 1 illustrates a system diagram of a camera plugged into headwear using a Bluetooth/Wi-Fi connection to wirelessly communicate directly with external devices such as a smartphone, computer and tablet according embodiments of the present inventions.

There is need for a Bluetooth/Wi-Fi radio frequency technology that can send a data signal and receive a data signal with minimal delay in processing, almost instantaneously to and from a smartphone/tablet/computer to a receiver hidden into headwear/headgear. The Bluetooth/Wi-Fi signal can be in the form of various types of data being processed, such as transferring or sending images from a camera connected to the headwear/headgear to a smartphone/tablet/computer or receiving images from a smartphone/tablet/computer to the headwear/headgear, and or transferring or sending audio data from a microphone in the headwear/headgear to a smartphone/tablet/computer and or receiving audio data from a smartphone/tablet/computer/portable music player to the headwear/headgear. By definition instantaneously used as a "live streaming technology" where there is minimal delay in processing the data with image and audio processors that takes this same data and transfer it to the Bluetooth/Wi-Fi receiver so that the amount of time to process data is within seconds or faster. More specifically the ability to choose between both Bluetooth and Wi-Fi in the headwear/headgear is because the headwear/headgear, in this example the headwear/headgear can be using a Bluetooth connection (short range signal up to about 30 feet and limited to how many user can access the Bluetooth signal) to the smartphone/tablet and from there the smartphone/tablet can then use its Wi-Fi connection to connect to the internet using to local router to transmit data from the headwear/headgear, or that same smartphone/tablet can also use its 3G/4G/LTE connection thru its wireless provider to send this same data around the world using mobile telecommunications technology and its ultra-broadband Internet access. In the example of using the Wi-Fi connection (more long range signal up to 300 feet with many more users singed it at one time) hidden in the headwear/headgear the headwear/headgear user may connect to a smartphone (or multiple smartphones can connect to this headwear/headgear at one time), which allows for the data being sent from the headwear/headgear to the smartphone/tablet (or multiple smartphones/tablet) to be received and then either viewed on the smartphone (or multiple smartphones) almost instantaneously, and or that same signal from the headwear/headgear can also use its 3G/4G/LTE connection thru its wireless provider to send this same data around the world using mobile telecommunications technology and its ultra-broadband Internet access. This same Bluetooth/Wi-Fi radio frequency technology can be used to receive data from a smartphone/tablet/portable music player almost instantaneously; this allows for data such as photo and video images, audio/sound/voice, text messaging, etc. to be accessed from a smartphone/tablet/portable music player to be and be processed so that the headwear/headgear can play back on the headwear/headgear hidden devices (such as micro projector and speakers). In addition this technology has been design so that all the Bluetooth/Wi-Fi functions of the camera (zooming, focusing, video verves snapshot, brightness of image, etc.), microphone (volume, mute, etc.), and the incoming data coming into the headwear/headgear such as speakers (volume, mute, etc.) or images coming into the headwear/headgear, can be performed with the external devices with a software uniquely designed and downloaded into a smartphone/tablet/or a music player for use with this specific headwear/headgear (for example you can use a smartphone/tablet to operate any and all functions of the technology for the camera like zooming, video verves snapshot, brightness of image, volume, etc.), and another example is a potable music player can adjust the volume from the music player instead of having to push various controls within the headgear. The software will dictate the functions you desire for both camera's image processing component and or audio processing component. In addition the software will determine the amount of pixels being used, the rate of download speed, adjust frequencies (between 2.4 GHz to 5 GHz), how many users, create password protection, configure the data it to be used in conjunction with other software's like Skype, Facebook, google mail, google maps, using JAVASCRIPT, API, and SDK interface so that not only your home/desktop computer or online LAMP stack technology, VOIP and P2P technology and or IPhone, Android and other smartphone software and or "apps" technology (smartphone software applications) can work with the headwear/headgear but many of the IPhone and Android software and apps that may want access to the headwear/headgear technology, such as photos, video, audio, reading text that come into your phone, reading emails, etc. in addition this specifically designed headwear/headgear has a unique "Plug-In-Play" modular devices (such as a camera, LED lights, and a micro projector), that are all attachable/detachable. Using the headwear/headgear multifunction one port (plug) technology you can plug in multiple devices in that port (plug), for example plug in a light unit, plug in a micro digital camera, and plug in a fan you can add additional devices like speakers, to another port (plug) at the same time. In addition you have the ability to add multiple devices at one time to the headwear/headgear; for example you can add 2, 3 to 4 micro digital cameras in separate locations therefore allowing for a 360 degree views to be transmitted from the headwear/headgear to a smartphone/tablet.

FIG. 1 illustrates a system diagram of a camera 330 plugged into headwear 201 using a Bluetooth/Wi-Fi connection to wirelessly communicate directly with external devices. This illustration also shows an optional built-in microphone 427 into the headwear 201 that will send audio signal from the Bluetooth/Wi-Fi connection to external devices. External devises include smartphone 461, computer 462 and tablet 463. Software 465 can be downloaded into these devices enabling the smartphone 461, computer 462, tablet 463 and other devices to display the images that the camera 330 is processing.

Figure 2:
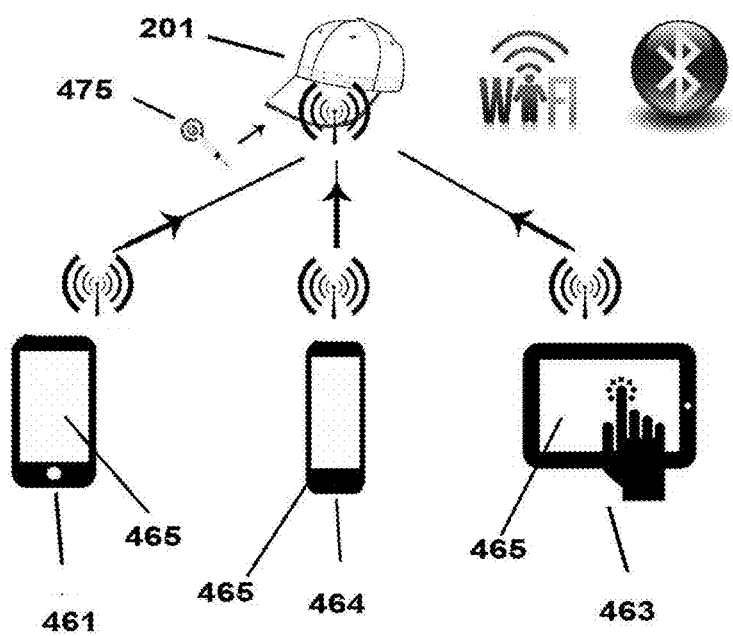
FIG. 2 illustrates a system diagram of an attachable/detachable speaker/headphone plugged into headwear to wirelessly communicate using a Bluetooth/Wi-Fi connection directly with the headwear so music and or audio can be sent from an external device such as a smartphone to the headwear according embodiments of the present inventions.

FIG. 2 illustrates a system diagram of an attachable/detachable speaker/headphone 475 plugged into headwear 201 to wirelessly communicate using a Bluetooth/Wi-Fi connection directly with the headwear 201 so music and or audio can be sent from an external device such as a smartphone 461 to the headwear 201. Software 465 can be downloaded into these devices to enable the smartphone 461, music player 464, tablet 463 or other device to send audio to the headwear 201 enabling the headwear to play music wirelessly.

Figure 3:
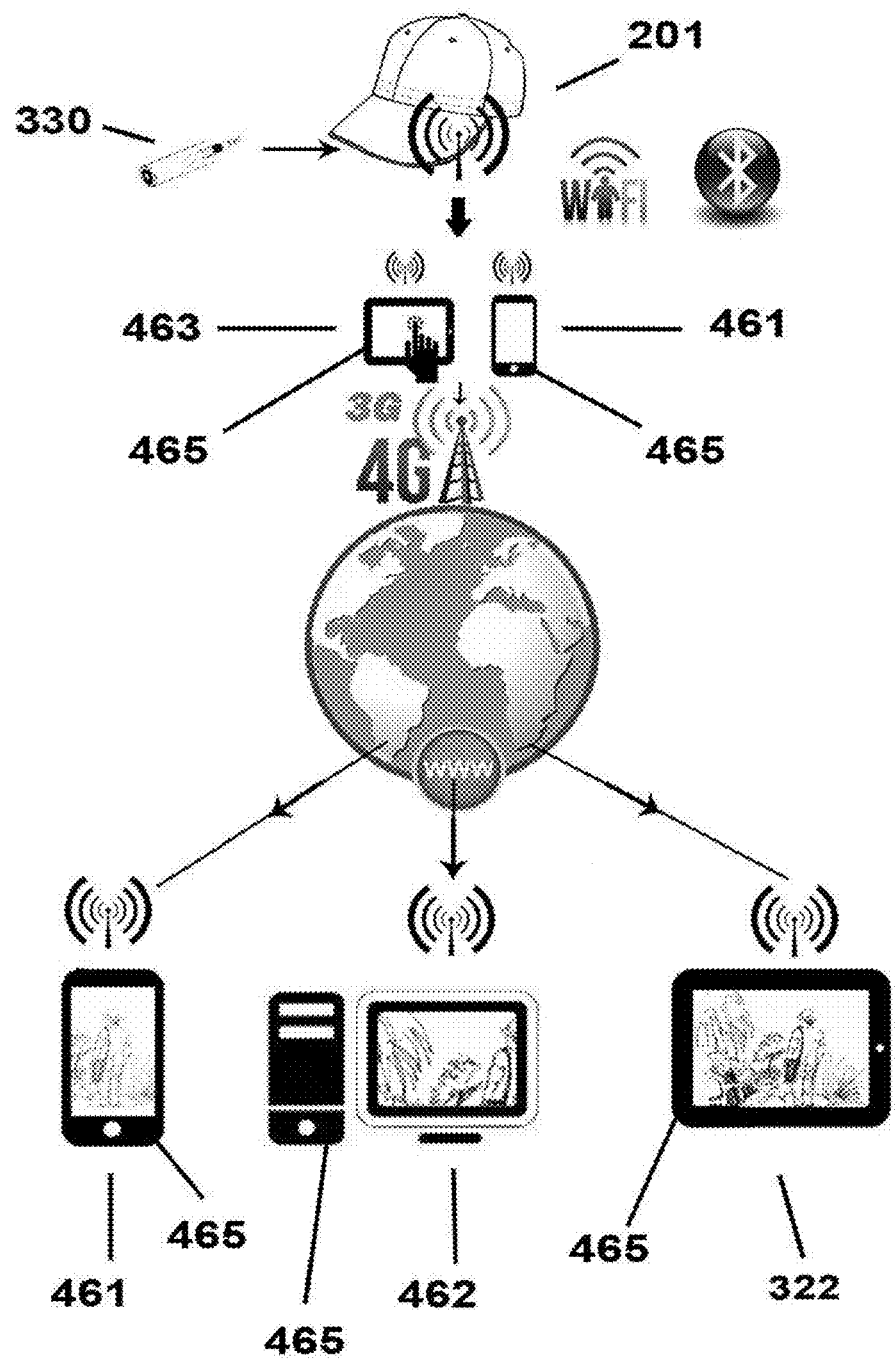
FIG. 3 illustrates a system diagram of an attachable/detachable camera using Bluetooth/Wi-Fi connection to wirelessly communicate from a headwear with a smartphone and the signal from the smartphone wirelessly communicates to other devices using high speed data transfer technology (3G and 4G) to transfer this data from the camera to other devices around the world according embodiments of the present inventions.

FIG. 3 illustrates a system diagram of the attachable/detachable camera 330 plugged in to headwear 201 using Bluetooth/Wi-Fi connection to wirelessly communicate from a headwear 201 with a smartphone 461, and the signal from that smartphone 461 wirelessly communicates to other devices using high speed data transfer technology (3G and 4G) to transfer this data from the camera 330 to other devices around the world. External devises include smartphone 461, computer 462 and tablet 463; and it shows how the newly designed software 465 downloaded to each smartphone, tablets and or computer can independently control the camera view. In this example you can see the same image on three devices; however the image on the smartphone 461 has been zoomed in on to a particular person and is brighter; and in the case of the computer 462 you can see the image is zoomed in but not directed to a specific person or tree, and in the case of the tablet 463 the image is a full view of what the camera 330 is showing. There are many different camera 330 controls that the software 465 can be designed to operate and that can be performed remotely from each device in addition to zooming, picture resolution (increased pixels), record a snapshot from the camera 330 on to your device, record a video from the camera on to your device, send image to your Facebook page, or you can use existing companies technology such as Skype or any other imaging processing software 465 where the camera 330 becomes an add-on to what your Skype login user camera view. For example, let's say you have your smartphone and you are logged into your Skype account on your smartphone 461, the camera software 465 from our headwear 201 can be designed to include the camera 330 from the headwear 201 to the Skype software and the person who is logged into the persons Skype account who is using the headwear 201 can have then see what image the camera 330 is viewing.

Figure 4:
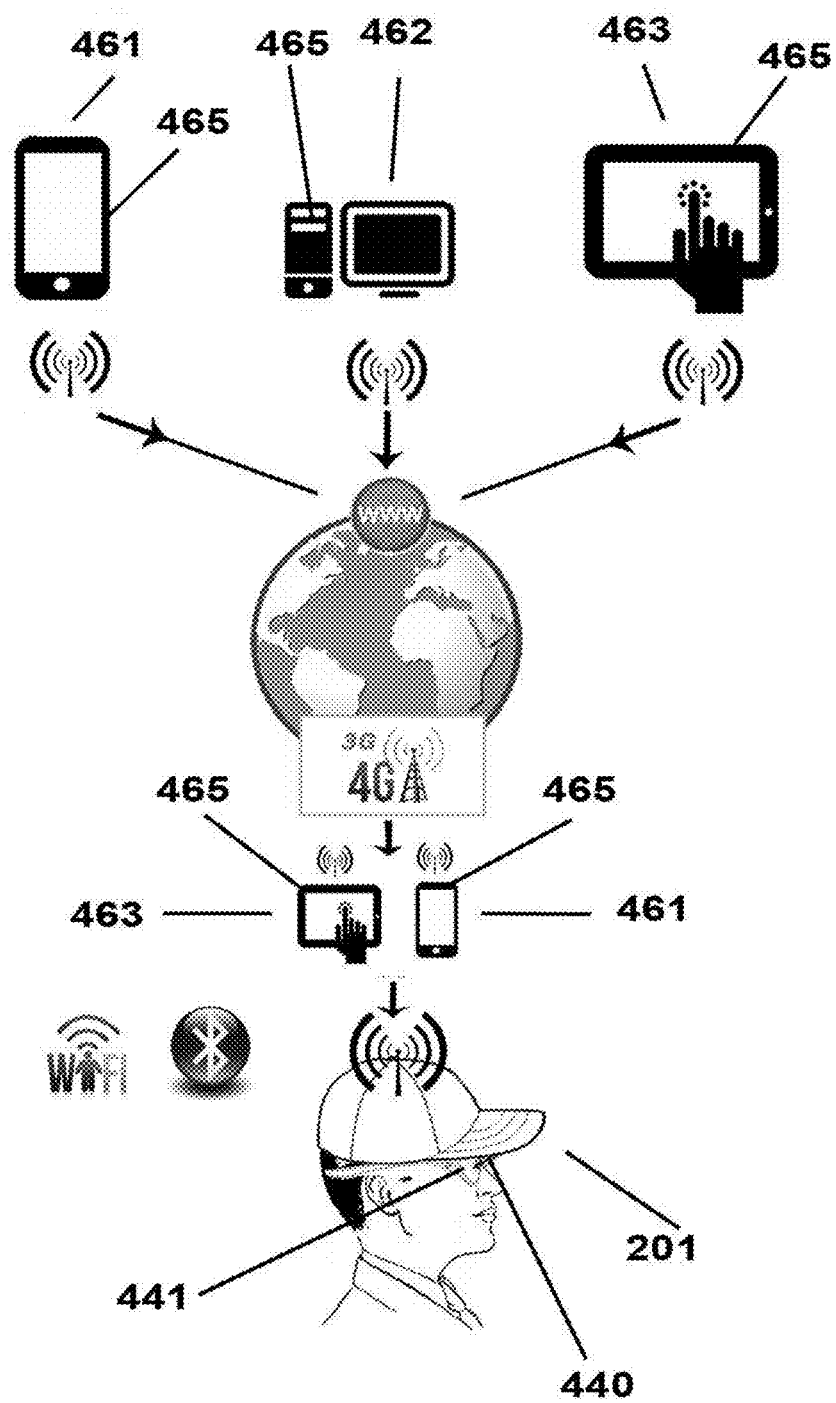
FIG. 4 illustrates a system diagram of a Bluetooth/Wi-Fi wireless connection and how a data signal can be wirelessly sent from a smartphone, a tablet, or a computer thru the World Wide Web into a smartphone to the headwear with an attachable/detachable micro projector that will project image on to glasses according embodiments of the present inventions.

FIG. 4 illustrates a system diagram of a Bluetooth/Wi-Fi connection and how a data signal can be wirelessly sent from a smartphone 461, a tablet 463, or a computer 463 thru the World Wide Web into a smartphone 461 located within approximately 300 feet of headwear 201 with built-in Bluetooth/Wi-Fi connection with an attachable/detachable micro projector 440 that will project image on to glasses 441; and how the new software 465 can be downloaded into these devices so enabling the smartphone 461, computer 462 and tablet 463 send images to the headwear 201 enabling the headwear user to view messages and or images wirelessly from these devices.

Figure 5:
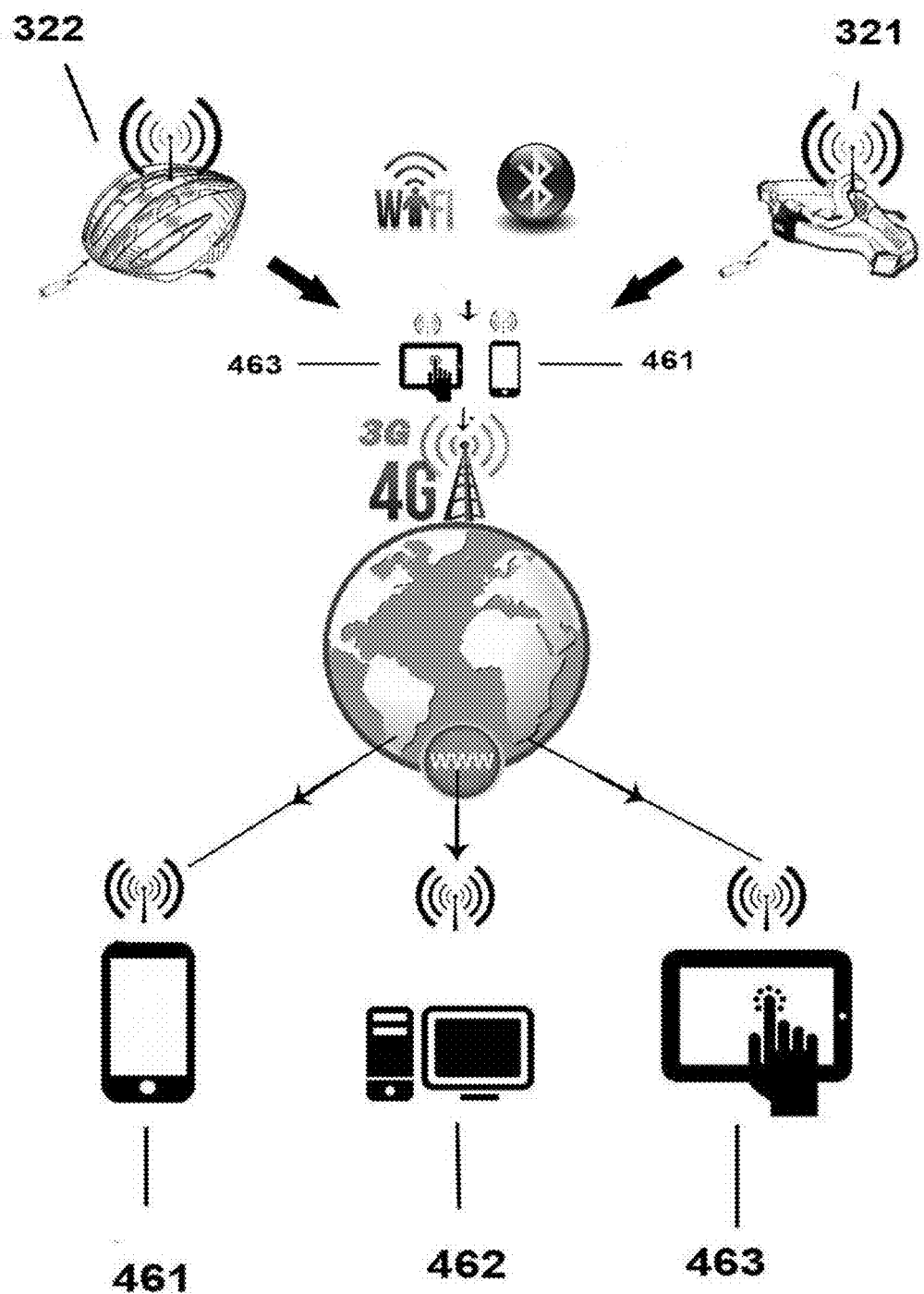
FIG. 5 illustrates a system diagram of an attachable/detachable camera using a Bluetooth/Wi-Fi connection communicating from a headlamp or a safety helmet wirelessly communicates with an external devices such as a smartphone and the signal from that smartphone wirelessly communicates to other devices using high speed data transfer technology (3g and 4G) according embodiments of the present inventions.

FIG. 5 illustrates a system diagram of the attachable/detachable camera 330 using a Bluetooth/Wi-Fi connection communicating from a headlamp 321 or a safety helmet 322 communicates with a smartphone 461, and the signal from that smartphone 461 wirelessly communicates to other external devices using high speed data transfer technology (3g/4G/data signal) to transfer data from the camera 330 to other devices around the world. External devises include smartphone 461, computer 462 and tablet 463.

Figure 6:
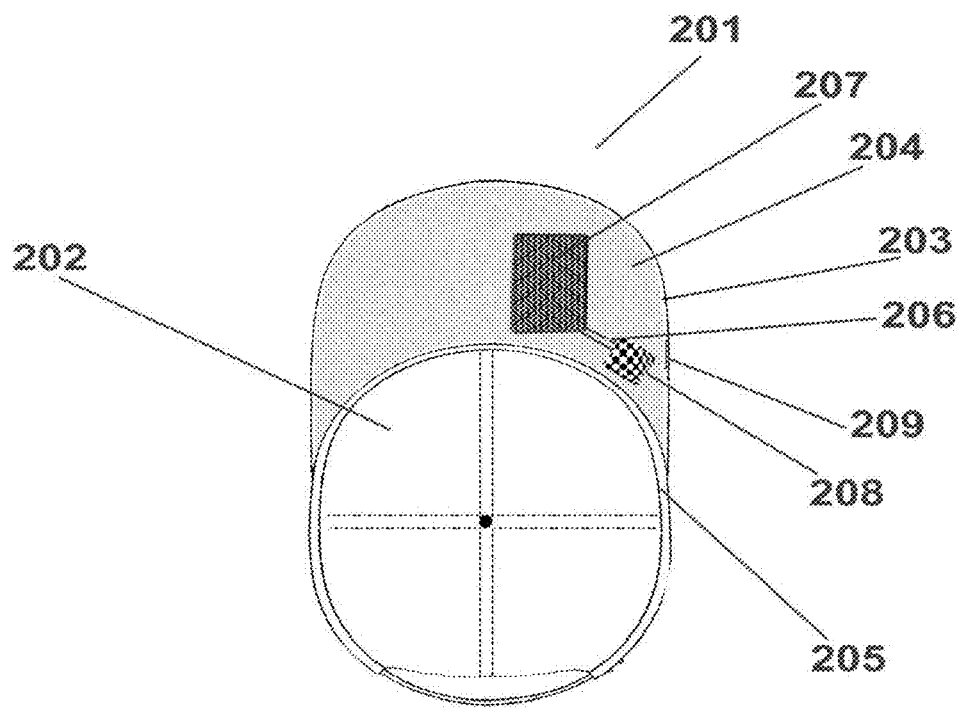
FIG. 6 illustrates an underside plan view of the completed headwear with the Bluetooth/Wireless technology is built into a brim and an antenna is placed in the brim of the headwear according to one embodiment of the present inventions.

FIG. 6 illustrates a underside plan view of an embodiment of the completed headwear 201 where the Bluetooth/Wireless component 208 is mounted to the brim insert 204 and is connected to a power source 207 using wires 206, both the power source 207 and the Bluetooth/Wi-Fi component are located in-between the brim insert material 204 and bottom layer of brim material 203 that covers the brim insert material 204. Both the power source 207 and the Bluetooth/Wi-Fi component 208 may be adjustment to the lower surface of the brim material 204, and or may be recessed into the brim insert material 204 or hole cut into the brim insert material 204 to hold the power source 207 and the Bluetooth/Wi-Fi component 208; and the antenna 209 that may be built into the Bluetooth/Wi-Fi component or it may be external from the Bluetooth/Wi-Fi component and may be located on the outer edge of the brim insert 204.

Figure 7:
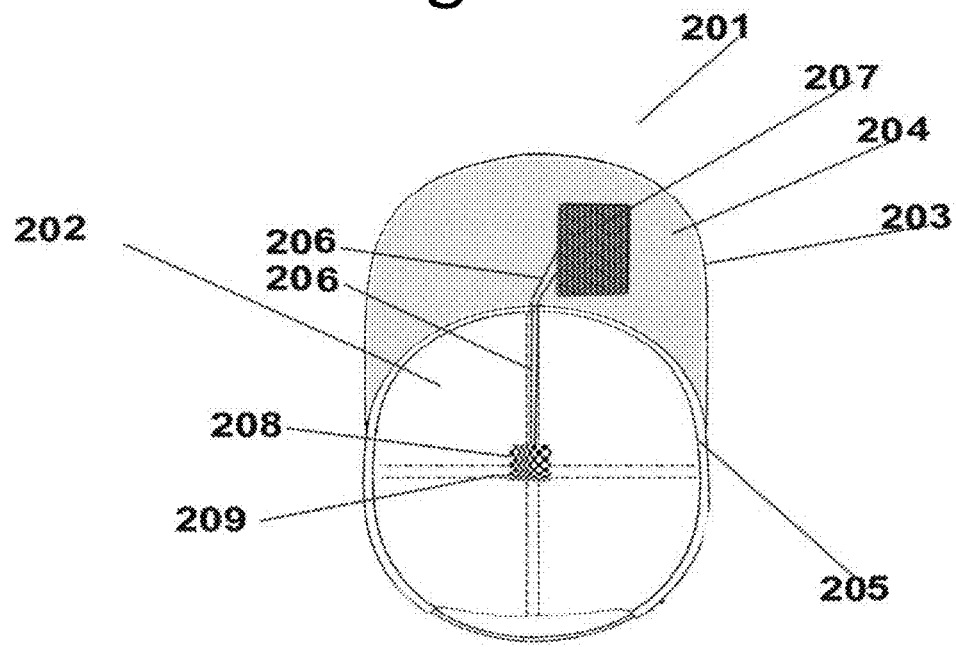
FIG. 7 illustrates an underside plan view of the completed headwear with the Bluetooth/Wireless technology is built into a crown and an antenna is placed in the crown of the headwear according to one embodiment of the present inventions.

FIG. 7 illustrates an underside plan view of an embodiment of the completed headwear 201 with the Bluetooth/Wireless component 208 is built into the crown 202 of the headwear 201 and the antenna 209 is placed in the crown 202 of the headwear 201. The power source 207 may be located in the brim insert material 204 and the Bluetooth/Wi-Fi component 208 is located in the crown 202 and can be connected using wire 206. The antenna 209 is located in the crown 202 and is adjacent to the Bluetooth/Wi-Fi component 208.

FIG. 8 illustrates a perspective view of an embodiment of the completed headwear 401 with this power source 414 may be one more power sources 414; the power source 414 in this embodiment may be a rechargeable power source 414; the power source 414 is located in-between the top layer of brim material 406 and the bottom layer of brim material 407; and are connected to wires 412 that connects to a USB port 413 (Universal Serial Bus Port) to add power to the one or more batteries 414, and an image processor 420 is located in the crown 403 of the headwear 401, in this embodiment the image processor Component 420 may or may not be an attachable/detachable image processor Component 420, if attachable/detachable it makes it possible to remove/replace the image processor component 420 by adding a connecting plug 422 to the image processing component 420 and a connecting plug 422 to the wires 412 that connect the image processing component 420 to one or more power sources 414 and to the one or more receptacles 419 located in headwear 401. The image processing component 420 may have an integrated control switch 421 to operate on-and-off function or of the image processing component 420. The Bluetooth/wireless transmitter 416 in this embodiment may be located in the crown 403; and is connected to the image processing component 420 and to the power source 414; and may be attachable/detachable using a plug 422 or may be permanently mounted to the crown 403. In this embodiment it also shows a possible on-off switch 418 located in-between the top layer of brim material 406 and the bottom layer of brim material 407 to operate on-off function of power going to the receptacles 419 and the power indicator LED light 417 that indicates if power is on or off; and the switch 418 can also operate the power going to the Bluetooth/Wi-Fi transmitter 416 and or the image processing component 420.

FIG. 9 illustrates a underside perspective view of a completed embodiment of the headwear with a power source 414; and the power source 414 in this embodiment may be a rechargeable power source 414; the power source 414 is located in-between the top layer of brim material 406 and the bottom layer of brim material 407; and are connected to wires 412 that connects to a USB port 413 (Universal Serial Bus Port) to add power to the battery 414; and a microphone 427 and is located on the lower surface of the brim insert material 405 and between the bottom layer of the brim material 407, the bottom layer of brim material 407 may have one larger hole cut into the bottom layer of brim material 407 to expose the microphone 427 or it may have multiple much smaller holes cut into the bottom layer of brim material 407; an dual purpose component 428 that has both sound processor and a built-in Bluetooth/wireless transmitter all in one, a small power indicator LED light 417 to show that the power is on or off to the receptacle 419 and the sound processor Component 428 with built-in Bluetooth/wireless transmitter with antenna 426 and the image processing component 420, and a switch 418 located in the brim between the bottom layer of brim material 407 to turn the power on and off to the receptacle 419 and the sound processor Component 428 with built-in Bluetooth/wireless transmitter and the image processing component 420; and how all the technology can be connected using wires 412. In addition in this configuration of the headwear 410 may have 2 or more receptacles 419, where one of the receptacle 419 is located in the brim, another receptacle 419 may be located in the rear of the headwear 401, another receptacle may be located on the left side of the headwear 401, and another receptacle may be located on the right side of the headwear 410. The purpose of having all multiple receptacle locations to allow for multiple (two or more) attachable/detachable camera's 330, this would enable the headwear 401 to show multiple cameras views at one time (similar to a 360 degree view), or can show each camera's view independently showing each of the multiple viewing locations at one time.

Figure 10:
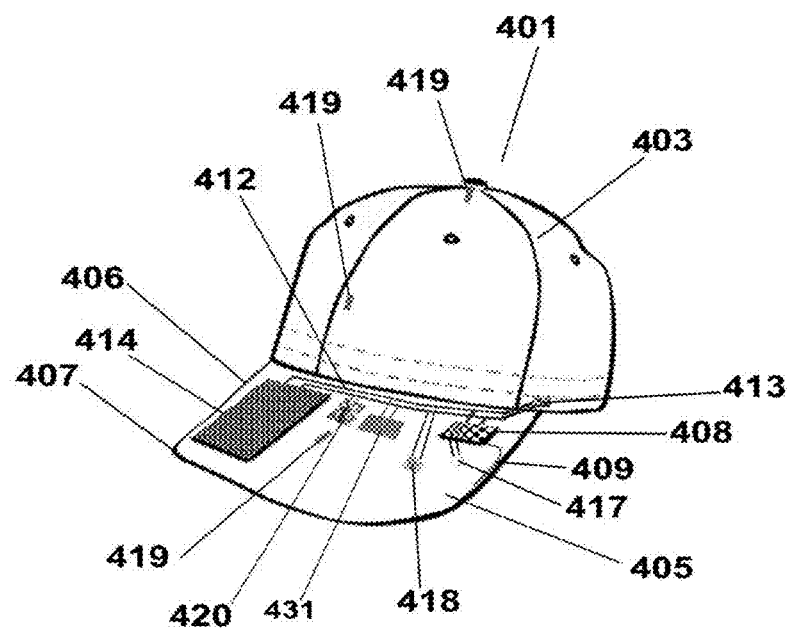
FIG. 10 illustrates a perspective view of the headwear with a power source and USB port (Universal Serial Bus Port) to add power to the battery, and image processor component and the Bluetooth/wireless transmitter and a data storage device is located in the brim of the headwear according one embodiment of the present inventions.

FIG. 10 illustrates a perspective view of an embodiment of the completed headwear 401 with this power source is located in-between the top layer of brim material 406 and the bottom layer of brim material 407 of the headwear 401; and a USB port 413 (Universal Serial Bus Port) to add power to the battery; and a data storage device 431 is located in-between the top layer of the brim material 406 and the bottom layer of the brim material 407, and the Bluetooth/wireless transmitter 408 is located in-between the top layer of the brim material 406 and the bottom layer of the brim material 407, the antenna 409, and the image processing component 420 is located in-between the top layer of the brim material 406 and the bottom layer of the brim material 407 a small power indicatory LED light 417 is located in-between the top layer of the brim material 406 and the bottom layer of the brim material 407. In this embodiment show alternative locations of the receptacle 419, one choice has the receptacle 419 located in-between the top layer of the brim material 406 and the bottom layer of the brim material 407, another choice has the receptacle 419 located near the front of the crown 403, and another choice has the receptacle located at the top of the crown 403.

Figure 11:
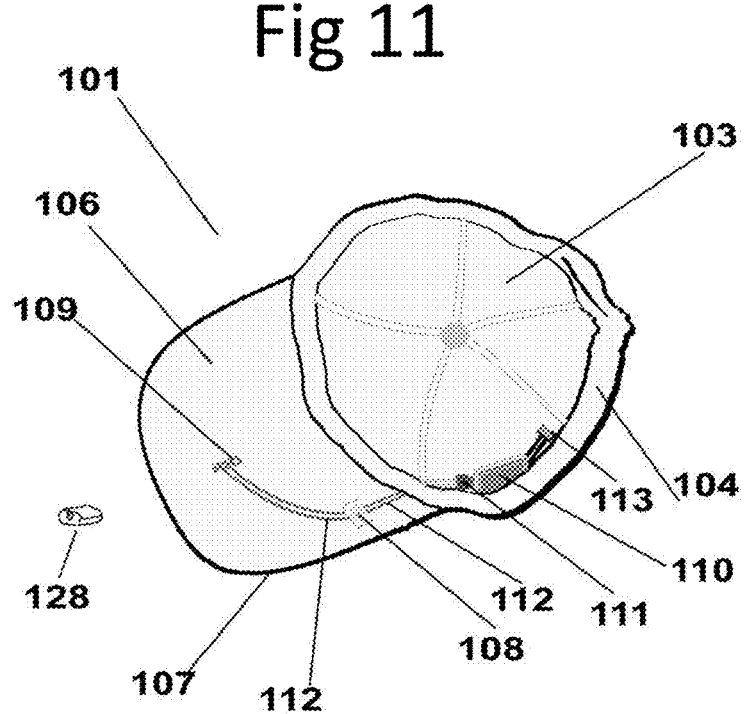
FIG. 11 illustrates an underside plan view of the headwear with the attachable/detachable micro sized camera and a USB port in the crown, and a power source in the crown according to embodiments of the present inventions according one embodiment of the present inventions.

FIG. 11 illustrates an underside plan view of an embodiment of the completed headwear 101 with the attachable/detachable micro sized camera 128 and a USB port 113 in the crown 103, a receptacle 109 located in-between the top layer of the brim material 106 and the bottom layer of the brim material 107, wires 112 to connect a plug 111 that is connected to a demountable power source 110 to the on-off switch 108 and wires 112 from switch 108 to the receptacle 109.

Figure 12:
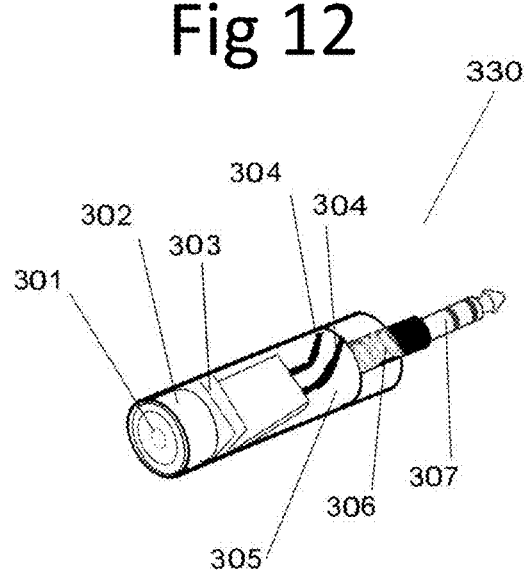
FIG. 12 illustrates a perceptive view of an attachable/detachable micro camera built into a holder with a plug according one embodiment of the present inventions.

FIG. 12 illustrates a perceptive view of an attachable/detachable micro camera 330 built into a holder 305; and the holder 305 that has an integrated adjustable gear 306 that allows for the camera 330 to be directed up and down to a preferred angle of the user; and an integrated plug 307 in the holder 305. It also shows the hole 301 for the lens 302, the micro camera lens assembly 302, the image sensor 303, and the wires from the image sensor 303 to the plug 307.

Figure 13:
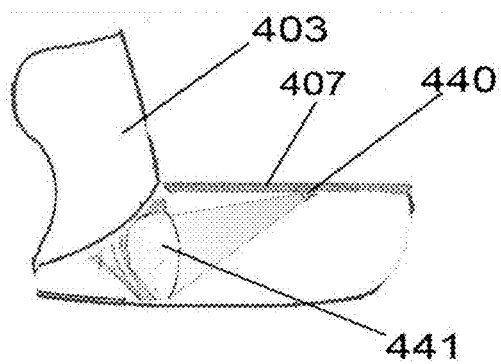
FIG. 13 illustrates a perspective views of an attachable/detachable micro projector is attached to headwear according one embodiment of the present inventions.

FIG. 13 illustrates a perspective view of an attachable/detachable micro projector 440 that is attached to the underside of a brim 406 and projects and image on to a pair of glasses 441.

Figure 14:
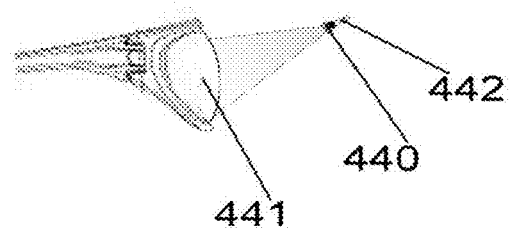
FIG. 14 illustrates a perspective views of an attachable/detachable micro projector projecting image onto a pair of glasses according one embodiment of the present inventions.

FIG. 14 illustrates a perspective view of an attachable/detachable micro projector 440 is projecting image onto a pair of glasses 441, and the micro projector has an integrated plug 442.

Figure 15:
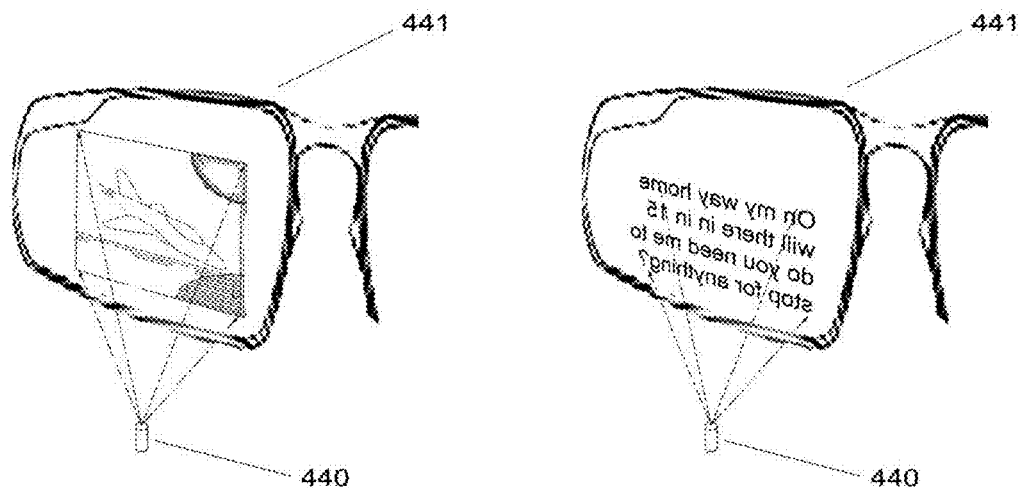
FIG. 15 illustrates a perspective views of two examples of an attachable/detachable micro projector image and text appearing on glasses according an embodiment of the present inventions.

FIG. 15 illustrates a perspective view of an attachable/detachable micro projector 440, is projecting an image and or text so image and or text will appear on glasses 441.

Figure 16:
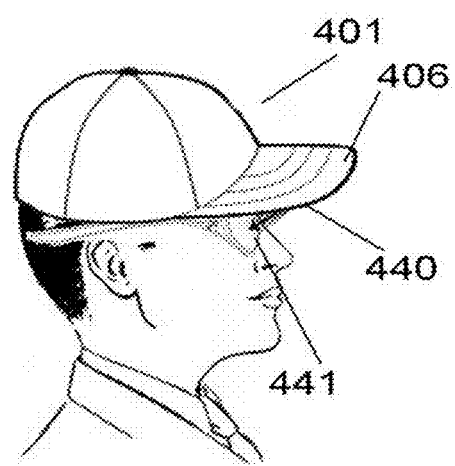
FIG. 16 illustrates a perspective view of an attachable/detachable micro projector being worn by a person using headwear and regular glasses bought on the open market according to an embodiment of the present inventions.

FIG. 16 illustrates a perspective view of a side view of the headwear 401 with a attachable/detachable micro projector 440 being worn by a person using headwear 401 and projecting an image on to the glasses 441, the glasses 441 are regular glasses 441 bought on the open market. The glasses can be either reading glasses, sun glasses, prescription glasses, or plain glasses with no optical correction.

Figure 17:
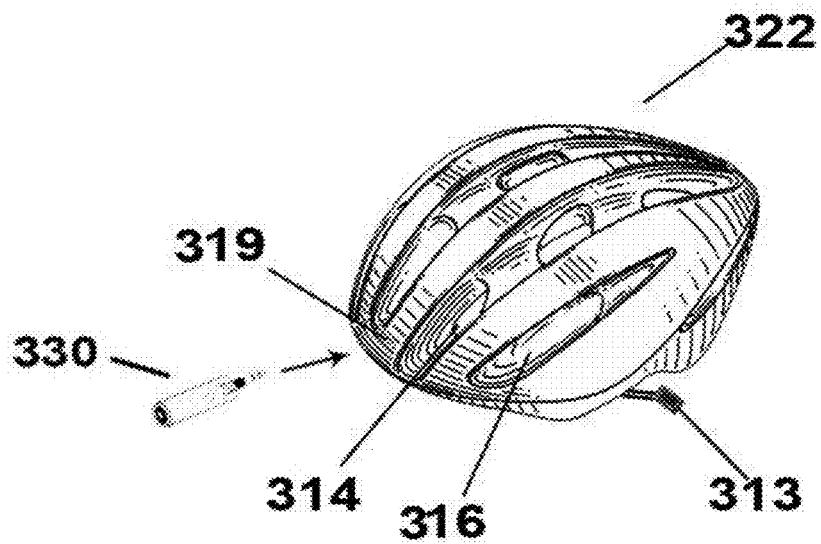
FIG. 17 illustrates a perspective view of an attachable/detachable micro camera with a safety helmet according an embodiment of the present inventions.

FIG. 17 illustrates a perspective view of an attachable/detachable micro camera 330 with a safety helmet 322; and a USB port 313 (Universal Serial Bus Port) that is connected to a rechargeable power source 314; and the safety helmet has image processor 316 hidden on the inside of the safety helmet 322; and a receptacle 319 integrated into the front of the safety helmet that is connected to the image processor 316 and the power source 314.

Figure 18:
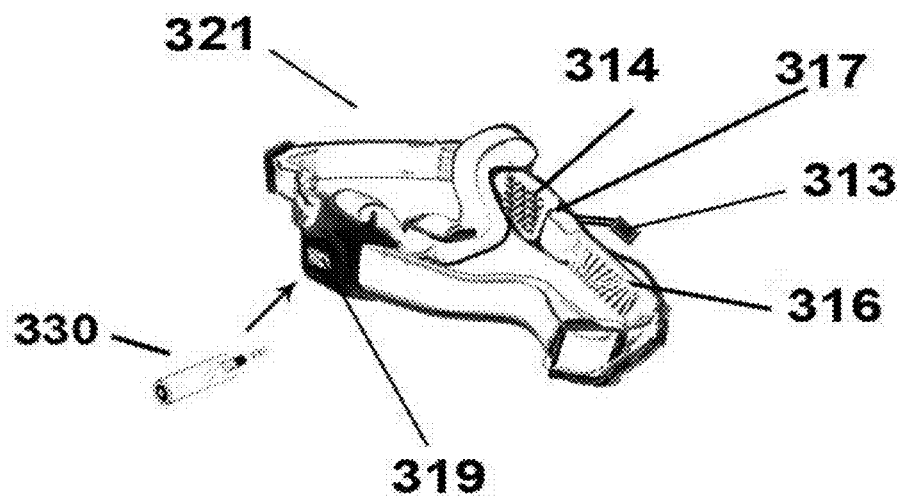
FIG. 18 illustrates a perspective view of an attachable/detachable micro camera with a headlamp according an embodiment of the present inventions.

FIG. 18 illustrates a perspective view of an attachable/detachable micro camera 330 with a headlamp 321; and a USB port 313 (Universal Serial Bus Port) that is connected to a rechargeable power source 314; and the headlamp has image processor 316 hidden in the inside of the headlamp 322; and a receptacle 319 integrated into the front of the headlamp that is connected to the image processor 316 and the power source 314.

Figure 19:
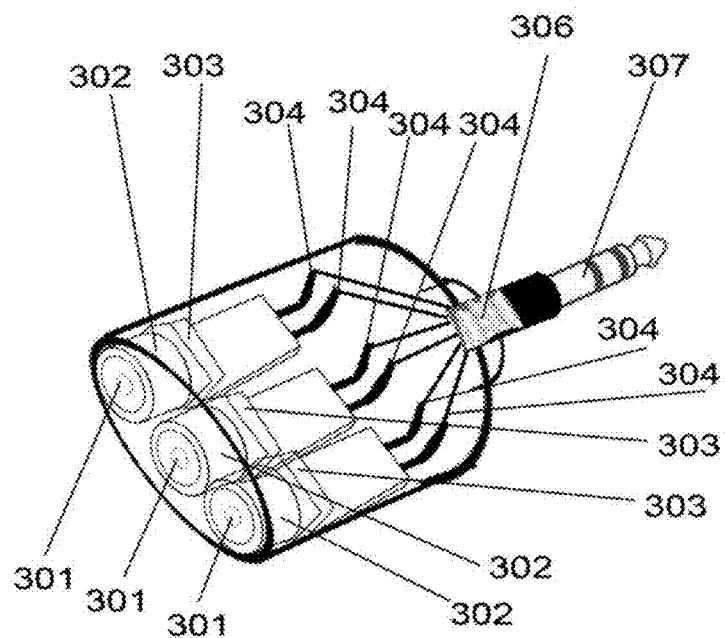
FIG. 19 illustrates a perceptive view of an attachable/detachable 3D micro camera built into a holder with a plug according an embodiment of the present inventions.

FIG. 19 illustrates a perceptive view of an attachable/detachable micro 3D camera 330 built into a holder 305; and the holder 305 that has an integrated adjustable gear 306 that allows for the camera 330 to be directed up and down to a preferred angle of the user; and an integrated plug 307 in the holder 305. It also shows the 3 holes 301 for the 3 lens 302, the 3 micro camera lens assemblies 302, the 3 image sensors 303, and the wires from the image sensors 303 to the plug 307.

Figure 20:
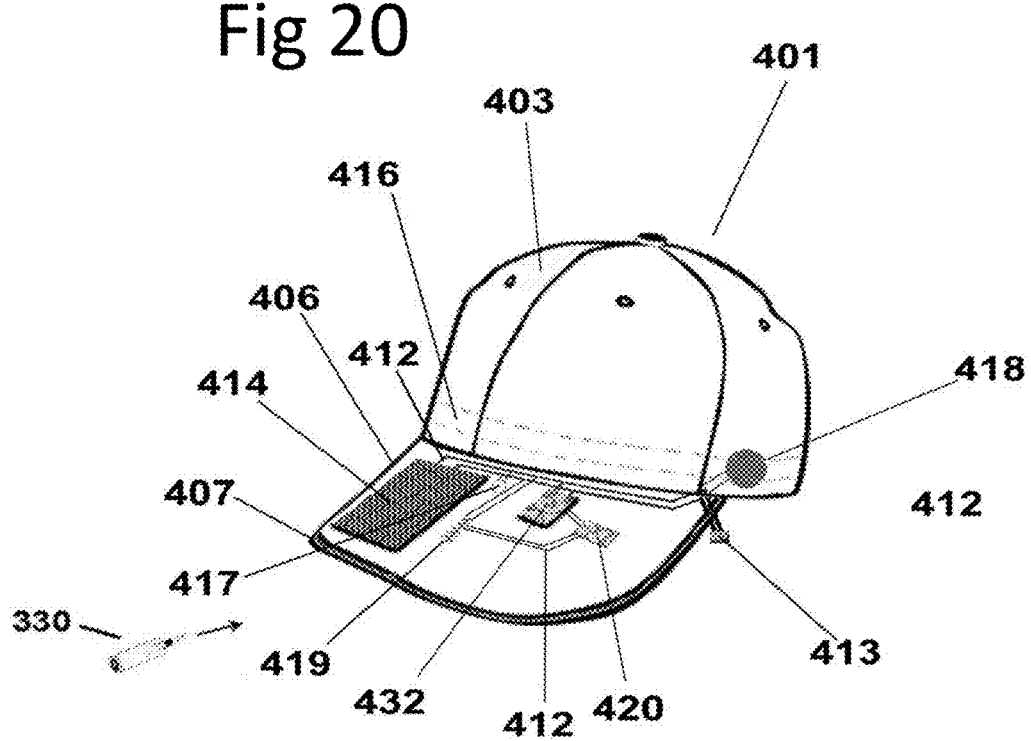
FIG. 20 illustrates a perspective view of the embodiment of the completed headwear with a power source and USB port (Universal Serial Bus Port) to add power to the battery, and image processor component and a data storage device is a FIFO (first in first out) video buffer located in the brim of the headwear according an embodiment of the present inventions.

FIG. 20 illustrates a perspective view of the embodiment of the completed headwear 401 with a power source 414;

and USB port 413 (Universal Serial Bus Port) to add power to the battery, and image processor Component 420 and a data storage device is a FIFO (first in first out) video buffer memory component 432 is located in-between the top layer of the brim material 406 and the bottom layer of the brim material 407 of the headwear 401; and the switch 418 to control the on-off power to the receptacle 419 is located in-between the top layer of the brim material 406 and the bottom layer of the brim material 407 of the headwear 401; wirers 412 connecting the power 414 to the plug 419, and the LED indicator light, and the FIFO video buffer are located in-between the top layer of the brim material 406 and the bottom layer of the brim material 407 of the headwear; when the power is on the FIFO video buffer 432 is continually recording all camera 330 the images and storing for a predetermined amount of time, for example if the FIFO video buffer 432 was set for only five minutes at a time it would store only five minutes of video captured by the camera 330. After the five minutes was recorded it would then automatically delete said video and begin a new five minute video that would be stored in the FIFO video buffer storage component 432. The user at their choice may permanently save one or more of the a five minute videos simply by pressing the record switch 433 in this case located in the crown 403; in the event the user chooses to permanently store a five minute video and then chooses to store a consecutive five minute video all they have to do is press the record switch 433 a second time within the second five minute interval and the first five minutes will be save with the second five minutes creating a ten minute video; this allows the user to download one or more of the of the five minute videos or longer videos either from the USB port 413 (Universal Serial Bus Port) or wirelessly using the Bluetooth/Wi-Fi component 416 to any data receiving compatible external device. The predetermined amount of time may or may not be adjusted or changed by using an external device such as a smartphone, tablet or home/desktop computer. Software 465 can be designed to manage this operation and can be done either remotely or with a direct connection the headwear.

Figure 21:
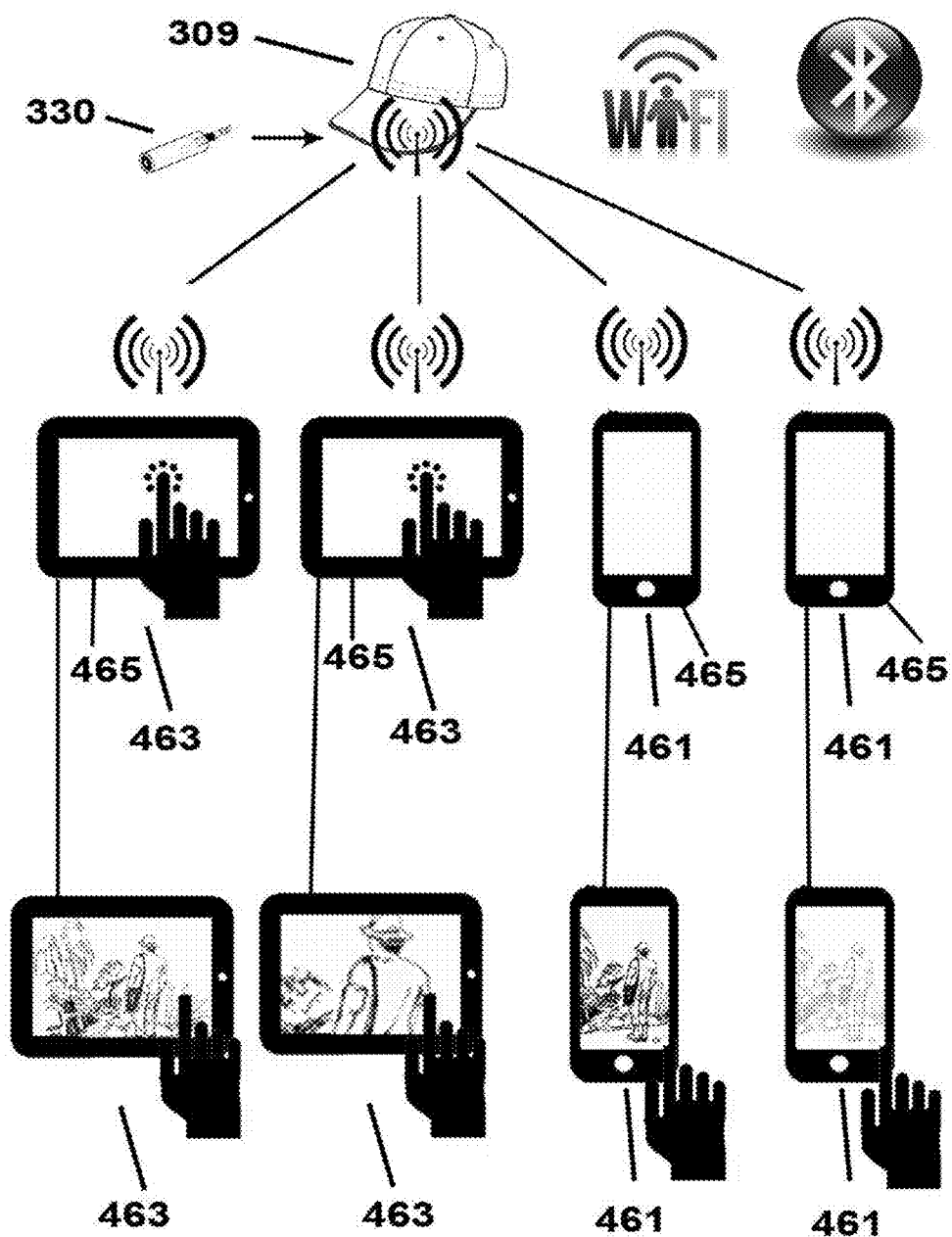
FIG. 21 illustrates a system diagram of the attachable/detachable camera using a Bluetooth/Wi-Fi connection wirelessly communicating simultaneously at the same time from a headwear with multiple devices such as smartphones such as smartphones and tablets which can view the same image and that each of the multiple devices can independently and remotely control the camera view in the headwear according embodiments of the present inventions.

FIG. 21 illustrates a system diagram of the attachable/detachable camera 330 using Bluetooth/Wi-Fi connection wirelessly communicating simultaneously at the same time from a headwear 309 with unlimited multiple external devices after downloading the new software 465, in this case there are two smartphones 461 and two tablets 463, this would also include computers using a Wi-Fi connection not shown; and shows how at the same time each smartphone 461 and tablet 463 can view the same image being captured by the camera 330 and shows how that each smartphone and tablets can independently and remotely control the camera view in the headwear. In the case of the two tablets you can see the same image on both devices; however one of the images has been zoomed in on; and in the case of the two smartphones you can see one of the images is lighter than the other image.

Figure 22:
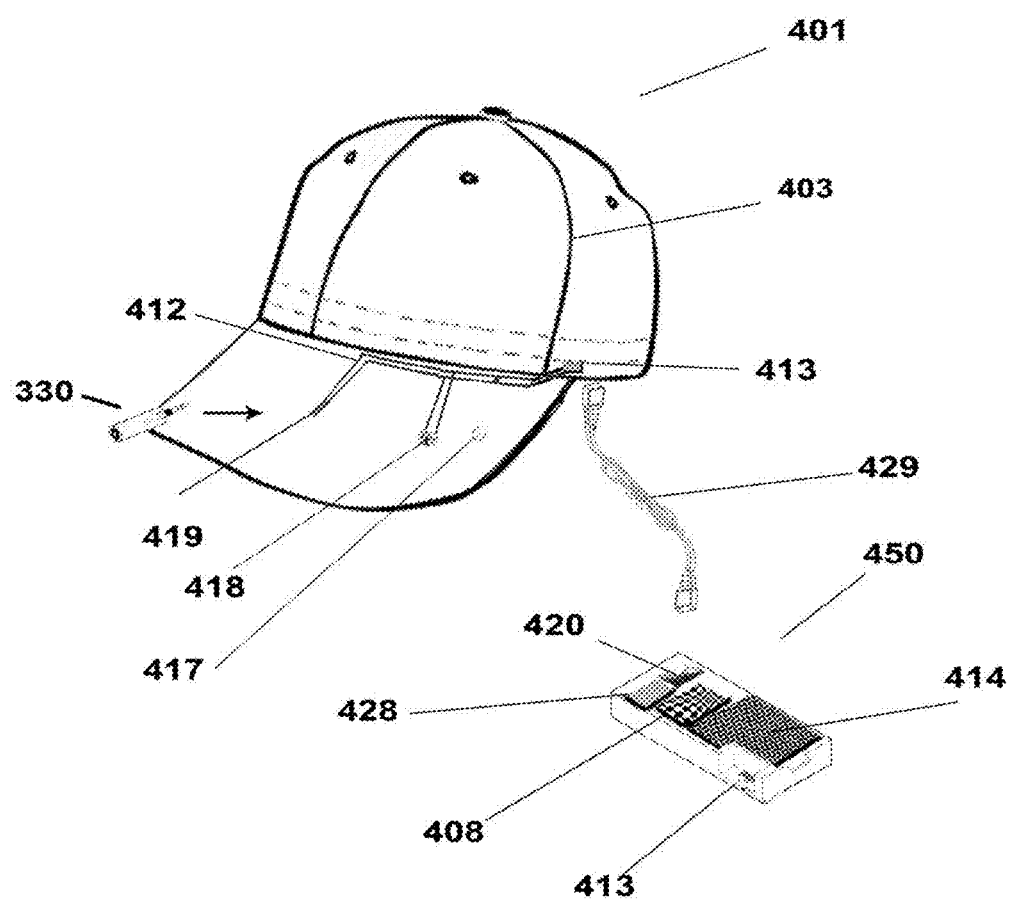
FIG. 22 illustrates a perceptive view of an attachable/detachable micro camera that plugs into headwear, a switch to control power and an LED indicator light built into a brim with power, image processor, audio processor, and Bluetooth/Wi-Fi components are external to the headwear and connectable to the headwear with a cord according embodiments of the present inventions.

FIG. 22 illustrates a perceptive view of an attachable/detachable micro camera that plugs into the headwear, a switch to control power 418 and the LED indicator light 417 are located in-between the top layer of the brim material 406 and the bottom layer of the brim material 407 of the headwear 401, and the LED indicator light 417 has a small hole cut into the material bottom layer of the brim material 407 so the Led indicatory light 417 can be seen; and all the power 414, image processor 420, audio processor 428, and Bluetooth/Wi-Fi components 408 are integrated into a hosing 450 that has a plug 413 to connect with the headwear 401 by using a cord 429.

Any signal processing techniques disclosed herein with reference to the accompanying drawings can be implemented wholly or partially as hardwired circuits. Nevertheless, such techniques could instead be implemented wholly or partially on one or more digital signal processors (DSPs) or other microprocessors. Further, it is appreciated by those of skill in the art that certain well known digital processing techniques are mathematically equivalent to one another and can be represented in different ways depending on choice of implementation.

Any letter designations such as (a) or (b) etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

Unless stated otherwise, terms such as "first" and "second" are used to arbitrarily distinguish between the elements such terms describe. Thus, these terms are not necessarily intended to indicate temporal or other prioritization of such elements.

Any trademarks listed herein are the property of their respective owners, and reference herein to such trademarks is generally intended to indicate the source of a particular product or service.

Although the inventions have been described and illustrated in the above description and drawings, it is understood that this description is by example only, and that numerous changes and modifications can be made by those skilled in the art without departing from the true spirit and scope of the inventions. Although the examples in the drawings depict only example constructions and embodiments, alternate embodiments are available given the teachings of the present patent disclosure.

What is claimed is:

1. A wireless headwear apparatus comprising:
a rear head-fitting crown portion having a lower edge;
a brim disposed on said crown portion proximate to said lower edge, an outer perimeter of the brim distal from said lower edge, the brim comprising a top layer of fabric material and a bottom layer of fabric material;
a rechargeable power source located inside the headgear connected to at least one built-in receptacle having at least two electrical leads to add power to the power source, wherein the at least one receptacle is built within the headwear and the receptacle may be partially exposed;
at least one externally attachable/detachable plug-in micro camera;
two or more electrical leads connecting the at least one externally attachable/detachable plug-in micro camera to the power source; and
a short range wireless data transmitter built within the headwear, wherein the short range wireless data transmitter is also connected to the power source and has the ability to send data from the at least one externally attachable/detachable plug-in micro camera to at least one wireless computing device, wherein the at least one wireless computing devices controls camera functions including but not limited to zooming, taking a snapshot, recording video, lightening and darkening images, increasing and decreasing pixels, compression of data.

2. A wireless headwear apparatus according to claim 1, wherein the transmitter can send a wireless short range data information signal to at least one of the multiple wireless computing devices located within a 300 foot radius; and wherein the at least one of the multiple wireless computing device may also be connected simultaneously to the headwear; and wherein the local wireless computing device can have wireless connectivity to access at least one of the long range data network service provider and wireless internet provider; and where that data signal from the wireless computing devices can be transmitted to at least one of the long range data network service provider and wireless internet provider and is sent to at least one of the multiple wireless computing devices and computers connected to at least one of the a long range data network service provider and wireless internet provider; and where at least one of the multiple wireless computing devices and computers are simultaneously connected to the signal being transmitted from at least one of the long range data network service provider and wireless internet provider; wherein the receiver will be able to individualize/personalize the data being received from the long range data signal to their wireless computing devices and computer allowing them the ability to use special camera features and audio features independently from the at least one of the other wireless computing devices and computers; including but not limited to zooming independently, recording independently, take a snapshot independently, choose which camera to view independently, change color and brightness independently, adjust volume independently.

3. A wireless headwear apparatus according to claim 2, wherein wireless computing devices can receive wireless long range data signal to and from an at least one of the multiple wireless computing devices using at least one of the short range connection and long range data connection; and at least one of the functions wherein the ability to receive from a wireless service providers network with existing desktop computer software.

4. A wireless headwear apparatus according to claim 1, wherein the short range signal is chosen from the group consisting of Bluetooth and Wi-Fi.

5. A wireless headwear apparatus according to claim 1, wherein the camera controls to adjust the focus, adjusts zooms, adjusts color, adjusts brightness, adjusts the pixels, take snapshot, take video, and is controlled from at least one of the multiple wireless computing devices; and the data images can also be stored to at least one of the multiple wireless computing devices and a desktop computer.

6. A wireless headwear apparatus according to claim 2, wherein the long range data connection is chosen from the group consisting of 3G, 4G, Wi-Fi, satellite, World Wide Web, wireless service providers, and personal hot spot links.

7. A wireless headwear apparatus according to claim 1, wherein a built within the headwear to allow the microphone to be minimally exposed to the human eye and able to detect sounds outside the headwear; and where the audio processor is built within the headwear; and where the short range wireless data sending component sends the audio data signal to at least one of the multiple wireless computing devices, and computer that are receiving the audio data signal from the headwear the ability to independently control the microphone functions; including but not limited to adjusting the volume and recording the audio.

8. A wireless headwear apparatus according to claim 1, wherein at least one receptacle has two or more electrical leads used for one or more external attachable/detachable plug-in speakers/headphones.

9. A wireless headwear apparatus according to claim 1, wherein a hidden image processor component is located within the headwear.

10. A wireless headwear apparatus according to claim 1, wherein a hidden audio processor component is located within the headwear.

11. A wireless headwear apparatus according to claim 1, wherein a hidden data storage component is located within the headwear.

12. A wireless headwear apparatus according to claim 1, wherein the transmitter is a transceiver.

13. A wireless headwear apparatus according to claim 1,
wherein at least one of the headwear head fitting components and brim component has a built-in image processing component and a data memory storage device wherein the memory storage device comprises a FIFO (first in first out) video buffer of a predetermined duration; and
wherein the wireless headwear apparatus further comprises an instant save button operatively coupled to a processor of the at least one of the camera and the Short range component and the FIFO video buffer to preserve the contents of the FIFO video buffer upon activation of the instant save button.

14. A wireless headwear apparatus according to claim 13, wherein the processor preserves the contents of the FIFO video buffer during the entire predetermined duration upon activation of the instant save button when the instant save button when has not been activated during a preceding predetermined duration.

15. A wireless headwear apparatus according to claim 14, when the instant save button has been previously activated during a preceding predetermined duration, the processor preserves only the latter portion of the contents of the FIFO video buffer corresponding to the portion since the last operation of the instant save button.

16. A wireless headwear apparatus according to claim 13, wherein the processor preserves by copying and saving the contents of the FIFO video buffer to another portion of the memory upon activation of the instant save button.

17. A wireless headwear apparatus according to claim 13, wherein the processor preserves by tagging the current portion of the FIFO buffer for longer term storage beyond expiration of duration for the FIFO buffer.

18. A headwear apparatus including at least one micro camera integrated therewith, wherein the headwear apparatus further comprises a short range wireless data transmitter to send a wireless short range data information signal to portable wireless computing devices located within at least a 300 foot radius of the headwear apparatus; wherein at least one of the portable wireless computing devices includes access to at least one of the multiple long range data network service provider and wireless internet provider; and where that data signal from the wireless computing devices is transmittable to at least one of the long range data network service provider and wireless internet provider; and where at least one of the multiple wireless computing devices receiving the data from long range data network service provider and wireless internet provider are simultaneously connected to the signal being transmitted from long range data network service provider and or a wireless internet provider; and the at least one of the multiple wireless computing devices of the long range data network service provider and or a wireless internet provider data will be able to individualize/personalize the data being received from the long range data signal at least one of the multiple wireless computing devices allowing them the ability to use special camera features and audio features independently from the other wireless computing devices and computers connected to the long range data network service provider and wireless internet provider; including but not limited to zooming camera to view independently, change color and brightness independently, adjust volume independently.

\* \* \* \* \*